United States Patent [19]

Doisy et al.

[11] Patent Number: 5,101,383
[45] Date of Patent: Mar. 31, 1992

[54] METHOD FOR THE FORMATION OF CHANNELS FOR SONAR

[75] Inventors: Yves Doisy, Plascassier; André Le Gall, Brest, both of France

[73] Assignee: Thomson-CSF, Puteaux, France

[21] Appl. No.: 599,097

[22] Filed: Oct. 17, 1990

[30] Foreign Application Priority Data

Oct. 20, 1989 [FR] France .................. 89 13746

[51] Int. Cl.⁵ .................................................. G01S 15/00
[52] U.S. Cl. .................................................. 367/103
[58] Field of Search ............... 367/99, 100, 101, 103, 367/104; 128/661.01; 73/618, 633, 628

[56] References Cited

U.S. PATENT DOCUMENTS 3,419,845 12/1968 Thiede et al. .................. 367/103
4,736,630 4/1988 Takahashi et al. .................. 73/628

FOREIGN PATENT DOCUMENTS 114547 8/1984 European Pat. Off. .
142416 5/1985 European Pat. Off. .
151003 8/1985 European Pat. Off. .
205355 12/1986 European Pat. Off. .
211427 2/1987 European Pat. Off. .
1265003 3/1968 Fed. Rep. of Germany .

Primary Examiner—Daniel T. Pihulic
Attorney, Agent, or Firm—Oblon, Spivak, McClelland, Maier & Neustadt

[57] ABSTRACT

A sonar that enables an already localized object to be found again uses a transmission antenna fitted out to transmit only the two ±first order secondary lobes. This antenna is supplied with a set of frequencies tiered so that each of these lobes determines a series of channels at transmission corresponding to these frequencies and filling two sub-sectors located to the right and to the left of the antenna. The reception is done by forming two wide channels, each of which covers one of the two transmission sub-sectors. The discrimination in bearing at reception is done by the discrimination of the frequencies. To cover a more extensive sector, including especially the central part located between two sub-sectors, the antenna can be made to rotate mechanically. This enables the construction of a simplified sonar which can be used in a consumable way.

8 Claims, 2 Drawing Sheets

FIG_1
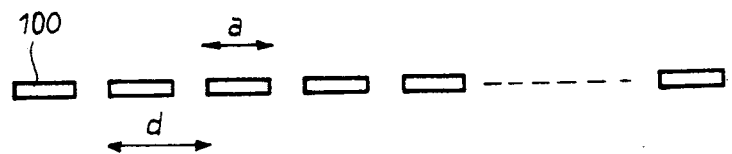
FIG_2
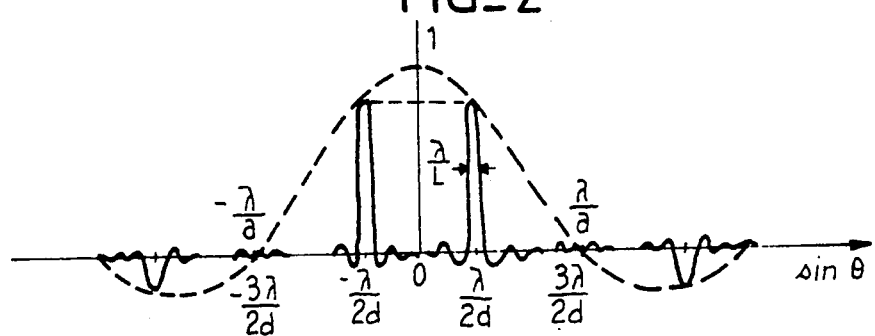
FIG_3
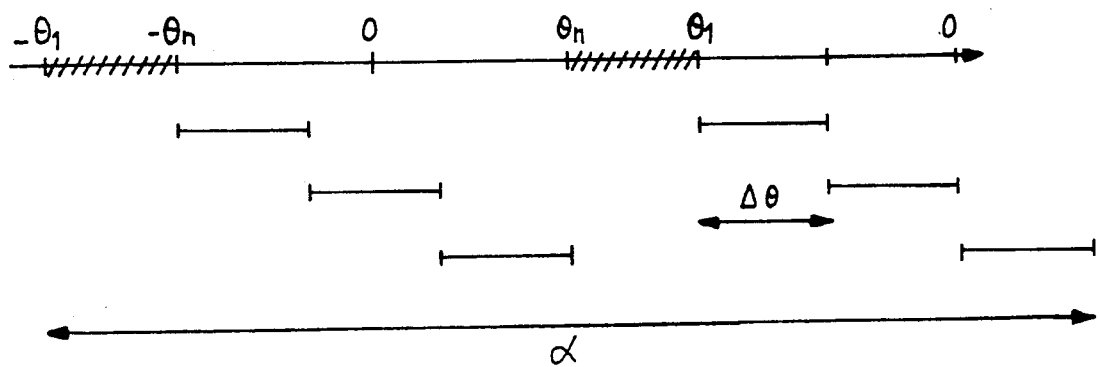

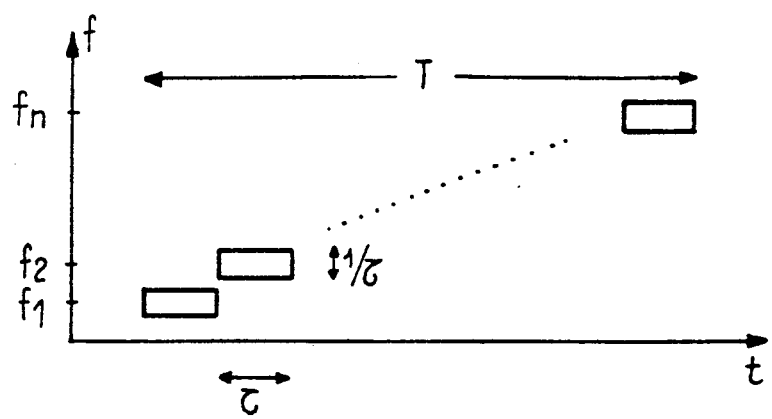
FIG_4
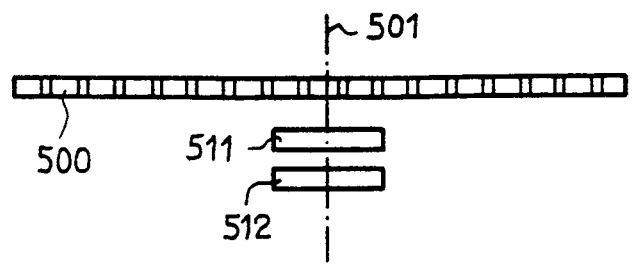
FIG_5
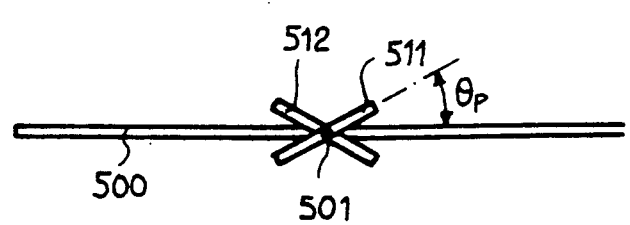
FIG_6
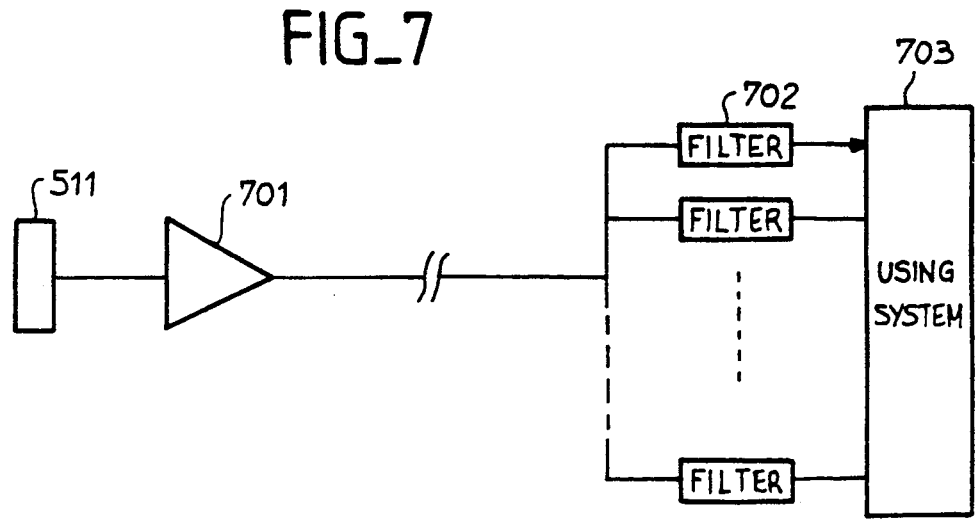
FIG_7

METHOD FOR THE FORMATION OF CHANNELS FOR SONAR

BACKGROUND OF THE INVENTION

1. Field of the Invention

The present invention pertains to methods for the formation of channels for sonars, notably for so-called relocalization sonars which enable precise localization of an object that has previously been roughly localized by a sonar.

If the relocalization sonar is then placed in a consumable piece of equipment, i.e. in one that is either destroyed or abandoned after use, the sonar is itself destroyed or abandoned. It is therefore necessary, in this case, to minimize its cost. This is made possible, in particular, by accepting characteristics inferior to those of localization and identification sonars since substantial information is already available on the localization and characteristics of the targets.

Typically, a relocalization sonar works at a frequency of the order of some hundreds of kHz, for example 500 kHZ, with a range of some tens of meters, for example between 50 and 100 m.

The performance characteristics sought then are, for example, an observation sector of about 60°, an angular resolution of between 1° and 2° and a resolution in distance of about 10 cm. Furthermore, the image rate should remain relatively high, 1 image/s at the minimum.

2. Description of the Prior Art

The various known approaches do not allow for meeting these conditions satisfactorily.

Thus, there is a known way of forming reception channels electronically, but this necessitates omnidirectional transmission throughout the sector of observation, and this requires high electrical power. Furthermore, a large number of channels (several tens of channels) have to be formed to obtain the desired resolution. This necessitates a proliferation of equipment and the use of a delay technique, and not a phase-shifting technique, owing to the high values of the offsets to be obtained. This approach is therefore very costly.

There is also a known way of making a directional transmission antenna that meets the conditions of the requisite angular resolution and, therefore, uses up little electrical energy because of the antenna gain. This antenna rotates with the reception antenna, but it is then no longer possible to obtain the desired image rate since it is necessary to wait for the return of the pulse before making the antenna rotate by the increment corresponding to the resolution.

Finally, there is a known way of making a sonar, described in the French patent No. 2 553 395, invented by Georges GRALL, filed on 25th Oct. 1983 by the present Applicant. This sonar has a stack of angularly offset antennas, each of which determines a sub-sector. This enables the antenna to be rotated at a sufficient speed to obtain the desired image rate. However, the volume of the equipment in such a system is great, and can be reduced to a reasonable value only for frequencies higher than those of the MHz range.

SUMMARY OF THE INVENTION

To obtain a relocalization sonar with performance characteristics that satisfy requirements, the invention proposes a method for the formation of channels for sonar wherein, chiefly, a transmission antenna is used having a radiation pattern essentially formed by two ±first order image lobes irrespectively of the transmission frequency, the orientation of these lobes depending on said frequency, and wherein this antenna is supplied by a set of frequencies tiered in such a way that the image lobes corresponding to these frequencies fill two sub-sectors that are symmetrical with the axis of the antenna and each occupy an angle $\theta$.

BRIEF DESCRIPTION OF THE DRAWINGS

Other characteristics and advantages of the invention will appear clearly from the following description, given as a non-restrictive example with reference to the appended figures, of which:

FIG. 1 shows a simplified diagram of an antenna according to the invention;

FIG. 2 shows the directional pattern of the antenna of FIG. 1;

FIG. 3 shows a sub-sectorwise scanning pattern of an antenna according to the invention;

FIG. 4 shows a graph of the frequency plane of a sonar according to the invention;

FIGS. 5 and 6 show a front view and a top view, respectively, of the transmission and reception antennas of a sonar according to the invention; and FIG. 7 shows one of two reception chains according to the invention.

DETAILED DESCRIPTION OF THE INVENTION

A sonar according to the invention includes a transmission sonar shown very schematically in FIG. 1. It has a set of elementary transmission transducers 100 with a length a. These transducers 100 are distributed with a pitch or spacing d on a straight line.

It is known that the directivity $D(\sin\theta)$ of a transmission such as this is given as a function of $\sin\theta$ by the formula:

$$D(\sin\theta) = \frac{\cos\left(\frac{N\pi d}{\lambda}\sin\theta\right)}{N\cos\left(\frac{\pi d}{\lambda}\sin\theta\right)} \quad (1)$$

FIG. 2 shows the directional pattern for this antenna, in the particular case where the length a of the elementary transducer is equal to ⅔ of the pitch p and where the adjacent sensors are supplied with signals phase-shifted by $\pi$, i.e. by reversing the polarity from one to the other.

In this figure, the line of dashes represents the directional pattern of an elementary sensor, and the solid line represents the directional pattern of the entire transmission antenna.

It is seen that, in this way, the major lobe as well as the ±second order lobes are eliminated, and there remain practically only the two ±first order lobes, this being so irrespectively of the frequency used.

According to the invention, then, during one and the same recurrence of the sonar, a succession of pulses is transmitted at different frequencies that correspond, for each pulse, to a determined direction of the two ±first order image lobes. Thus, a succession of transmission channels is formed, covering the entire field to be explored by using an adequate frequency plane.

At reception, two antennas are used. These two antennas have a wide aperture lobe so that one covers the sector to the left of the central axis of the antenna while the other covers the sector to the right of this axis. The discrimination in bearing is done by frequency discrimination on the echos received.

For a frequency $f_1$, the position of the two transmission lobes is given by the relationship:

$$\sin\theta_i = \frac{c}{2d f_i} \quad (2)$$

Taking $f_1$ to designate the lowest transmission frequency, $f_n$ the highest frequency, $\theta_n$ the highest offset angle and $\theta_n$ the smallest offset angle, the amplitude of the angular scanning is given by the relationship:

$$\sin\theta_1 - \sin\theta_n = \frac{f_n - f_1}{f_1 f_n} \times \frac{c}{2d} \quad (3)$$

If we then assume that $\theta_1 = \theta_n + \Delta\theta$, this relationship becomes:

$$\sin(\theta_n + \Delta\theta)\frac{f_1}{f_n} = \sin\theta_n \quad (4)$$

The transmission antenna therefore covers two angular fields that are symmetrical with the central axis of the antenna. Of these two fields, one corresponds therefore to the angular scanning of the image lobes from $\theta_1$ to $\theta_n$ and the other to the angular scanning of the image lobes from $-\theta_1$ to $-\theta_n$, giving a width of $\Delta\theta$.

There remains, quite clearly, a hole between these two sectors since the image lobes cannot be brought back on to the axis of the antenna: this would correspond to an infinite frequency.

This drawback can be overcome by different arrangements. Among these, a preferred embodiment of the invention consists in the use of a mechanical rotation of the antenna to cover an observation sector with an angular width $\alpha$.

To then obtain an accurate overlapping of the angular fields obtained by electron scanning according to the invention, it is necessary for the parameters to meet the relationships 5. In these parameters k is an integer.

$$\begin{aligned} 2\theta_n &= k\Delta\theta \\ \text{and } 2(k+1)\Delta\theta &= \alpha \end{aligned} \quad (5)$$

FIG. 3 shows a graph explaining these equations 5 when $k=5$, i.e. when three rotations, each by $\Delta\theta$, enable an angular sector with an aperture $\alpha$ to be covered. The first line shows the neutral position of the antenna with respect to the central axis 0 of the sector where the electron scanning makes it possible to cover a sub-sector to the left between $-\theta_n$ and $-\theta_1$, and a sub-sector to the right between $\theta_n$ and $\theta_1$. Three rightward mechanical rotations enable scanning up to the far right end of the sector $\alpha$. The rotations follow one another from the right towards the left and then from the left towards the right without interruption nor any return backwards before the end of the sector.

It is known that the width of a lobe with $-3$ dB attenuation, whether it is the major lobe or an image lobe, of an antenna with a length L working at the frequency $f_1$ is such that, c being the speed of sound in water:

$$\delta_i(\sin\theta) = \frac{0.9c}{f_i L} \quad (6)$$

The desired angular resolution corresponds to a maximum width $\delta(\sin\theta)$, which enables the length L of the antenna to be defined $$L = \frac{0.9C}{f_1 \delta(\sin\theta)} \quad (7)$$

The formulae 2, 4, 5 and 7 therefore enable the geometry of the transmission antenna to be defined entirely from parameters defined by the following data:

the range D, which sets the maximum frequency $f_n$;
the quality factor Q of the transducers which sets the minimum frequency $f_1$, on the basis of the relationship:

$$Q = \frac{f_1 + f_n}{2(f_n - f_1)} \quad (8)$$

the desired observation sector, which fixes $\alpha$, and the angular resolution in bearing, which sets $\delta\sin(\theta)$.

Since k must be an integer, it is appropriate to make a compromise between the values of $\alpha$, $f_1$ and $f_n$.

In practice, the value $\alpha$ is generally taken as the starting point, $\theta_n$ and $\_\theta$ are deduced therefrom, and then the value of $$\frac{f_1}{f_n}$$

is adjusted in keeping to the minimum value of Q.

In one exemplary embodiment with numerical values, it is sought to monitor a sector with an aperture $\alpha = 60°$, having a maximum range of 70 m and a resolution $\delta(\sin\theta)$ that is substantially equal to 1.2° in using transducers that enable a quality factor $Q=2$ to be obtained. Under these conditions, we obtain:

$$f_n = 825 \text{ kHz}, f_1 = 500 \text{ kHz}, \frac{f_1}{f_n} = 0{,}607$$

$\theta_n = 11{,}25°$, $\theta_1 = 18{,}75°$, $\theta = 7{,}5°$ and $k=3$. The length L of the antenna is then equal to 14 cm and the pitch d to 4.67 mm. This corresponds to $N=31$ transducers.

The transmission antenna is therefore formed by 31 transducers with a length of 3.11 mm spaced out at 4.67 mm.

As for the height of the transducers, it is determined by the directivity in elevation desired at the center frequency of the range used (662.5 kHz). For a vertical lobe width equal to 1 radian for example, a height of 2 mm is obtained for the transducers.

The image refreshing rate is determined on the basis of the frequency of recurrence of the transmission and the period of rotation of the antenna. This recurrence rate is equal to $$\frac{2D}{c}$$

and, if $T_r$ is the period of rotation on $\Delta\theta$, the rate of the images is given by the formula:

$$(k + 1)\frac{2D}{c} + kT_r \quad (9)$$

The rotation time depends on the moment of inertia of the movable assembly formed by the antennas and the motor that drives them, and on the power of this motor. With a moment of inertia that does not exceed 1 kg/cm² and a motor with power of about 4 watts, it is easy to achieve a rate of 50 ms per rotation, in using this motor which is, for example, of the stepping type, in "start-stop" mode. Under these conditions, the rotating direction at the end of the movement of the assembly gets reversed without any problem.

In the above-described example with numerical values, for $k=3$ and $D=70$ m, it is therefore possible to obtain an image rate of 570 ms, which is considerably lower than the rate of one second generally considered to be necessary to obtain an image that can be easily exploited by the operator.

FIG. 4 shows the timing diagram of the plane of frequencies of the transmissions of a sonar according to the invention.

At the start of each recurrence, for a duration T, each transducer transmits a series of pulses, with center frequencies $f_1$ that are staggered between $f_1$ and $f_n$ and each last for a duration $\Gamma$. This duration is determined by the desired resolution in distance $\delta r$ on the basis of the formula:

$$\frac{1}{\tau} = \frac{c}{2\,\delta r} \quad (10)$$

These center frequencies $f_1$ are obtained by determining the spacing between the transmission lobes so that these lobes overlap at a determined level, for example at an attenuation level of 3 dB at the most.

If we take $\delta_i{}^x(\sin\theta)$ to designate the width of a lobe with x decibels of attenuation, the overlapping condition at this attenuation level of two adjacent transmission lobes is written as follows:

$$\tfrac{1}{2}[\delta_1{}^x(\sin\theta) + \delta_{i+1}^x(\sin\theta)] = \sin\theta_i - \sin\theta_{i+1} \quad (11)$$

Since $\sin\theta_i = \frac{c}{2df_i}$ and $\delta_i{}^x(\sin\theta) = \frac{mc}{Lf_i}$ where m is equal to 0.9 for x=3 dB, we obtain the relationship:

$$f_{i+1} = \frac{1 + md/L}{1 - md/L} f_i \quad (12)$$

This relationship corresponds to a geometric progression $f_{i+1} = rf_i$ with a ratio:

$$r = \frac{1 + md/L}{1 - md/L}$$

Under these conditions, $f_n = r^{n-1}f_1$, and we therefore obtain the number n of frequency between $f_1$ and $f_n$, starting from the value m corresponding to the attenuation of the overlapping between lobes. To obtain an overlapping at least equal to $-3$dB, the value n obtained for $m=0.9$ is rounded out to the higher integer.

In the above-described example with numerical values, we obtain $n=10$. In then performing the computation in reverse, we find $m=838$ and an overlapping of the lobes at $-2.67$ dB. The frequency plane thus obtained is given by the following table:

| $f_i$ kHz | 500 | 528,6 | 558,9 | 590,8 | 624,6 | 660,4 | 698,2 | 738,1 | 780,4 | 825 |
|---|---|---|---|---|---|---|---|---|---|---|
| $\theta_i°$ | 18,75 | 17,7 | 16,71 | 15,79 | 14,91 | 14,09 | 13,31 | 12,58 | 11,89 | 11,25 |

Again, in the context of this example of an embodiment with numerical values, for a resolution of 10 cm, the duration $\tau$ of each pulse is equal to 0.13 ms and, hence, the total duration $\tau$ of the transmission is equal to 1.33 ms. Under these conditions, the product $f_i\tau$ is always great and is at least equal to 67. This means that the pulse includes a number of sinusoidal arcs sufficient for the frequency to be considered to be substantially pure.

It will be clearly seen that the frequency plane given herein represents only one embodiment of the invention and that it is possible, without going beyond the scope of the invention, to use other values of $f_i$ that include, for example, a degree of overlapping among lobes that is variable with the index i.

FIGS. 5 and 6 respectively show a front view and a top view of the set of transmission and reception antennas of a sonar according to the invention.

These antennas are fixed to an axis of rotation 501 with the transducers of the transmission antenna 500 aligned along a longitudinal axis. The reception antennas 511 and 512, designed to receive respectively the negative first order and positive first order images located to the left and to the right of the axis of transmission of the antenna 500, are each offset by an angle $\theta_p$ with respect to the longitudinal axis of the transmission antenna, which is itself perpendicular to the axis of transmission.

This angle $\theta_p$ is determined, in conjunction with the length $L_r$ of this antenna, so that the reception lobe of the antenna enables reception with a better attenuation level than the $-3$dB attenuation level between all the echos at frequency $f_1$ to $f_n$ included in the reception sub-sector determined by $\sin\theta_1$ and $\sin\theta_n$.

The length $L_r$ is determined by the formula:

$$\frac{0.9c}{L_r\left(\frac{f_1 + f_n}{2}\right)} \geq \Delta\sin\theta \quad (13)$$

the direction $\theta_p$ is then given by:

$$\sin\theta_p = \sin\theta_n + \frac{0.9c}{2L_rf_n} \quad (14)$$

In the example of a embodiment with numerical values described in this text, a length $L_r=1.61$ cm and an aiming angle $\theta_p$ equal to 14.23° are obtained.

These reception antennas may be formed by a single piece of piezoelectric ceramic with a length $L_r$ and a height identical to that of the transducers of the transmission antenna.

They may also be formed by several contiguous transducers, thus enabling the application, to these transducers, of weighting values that make it possible to lower the level of the secondary reception lobes.

FIG. 7 shows a very simplified drawing of one of the two reception chains of a sonar according to the invention, corresponding to the reception antenna 511.

Behind this antenna, a wideband preamplifier 701 enables the reception signals to be amplified by limiting them to the frequency interval $f_n - f_1$. Means not shown in the figure enable this amplifier to be inhibited when the transmission occurs. This inhibition time is very short as compared with the total recurrence time. This makes it possible to obtain only one reduced blind zone before the sonar. In the example with numerical values described further above, the inhibition time is equal to 1.33 ms while the recurrence lasts 93 ms.

The output of the preamplifier 701 is connected to a battery of n filters such as 702 in a comb arrangement. The bandwidth of each of these filters is equal to 1, and it is centered on one of the transmission center frequencies $f_i$. The spacing between these transmission frequencies is sufficient get rid of the imperfections of the filters as well as the Doppler shift, if any, which is equal, for example, to 1.65 kHz for a transmission at 825 kHz and a relative speed of 3 knots.

The outputs of these filters 702 are then applied to the using systems 703 which make it possible, for example, for the echos received to be displayed on a cathode-ray tube screen as a function of the channel in which they are received.

As a variant, the transmission of the frequencies could be encoded, and the battery of filters could be replaced by a battery of correlators working with the transmission mode. This transmission code may be, for example, a frequency modulation around $f_i$ in a band $$B = \frac{c}{2\delta r} \text{ with } \tau >> \frac{1}{B}.$$

This amounts to performing a coherent processing operation according to a known technique.

It is not necessary, in certain cases, to monitor a very extensive sector and it is possible, for example, to be satisfied with a sector having an aperture equal to $\delta\theta$. In this case, it is possible to use only one transmission lobe with only one reception antenna aimed in the direction $\theta_p$ without using any mechanical scanning of this assembly. By contrast, it will be worthwhile to use a weighting of the reception antenna to lower the level of the secondary reception lobes so as not to be hampered by the second transmission image lobe, which is always present.

What is claimed is:

1. A method for the formation of channels for sonar wherein a transmission antenna is used, having a radiation pattern essentially formed by two ±first order image lobes irrespectively of a transmission frequency thereof, the orientation of these lobes depending on said transmission frequency, and wherein he transmission antenna is supplied at each recurrence with pulses at tiered frequencies in such a way that the image lobes corresponding to these tiered frequencies fill two sub-sectors that are symmetrical with an axis of the antenna and each occupy an angle $\theta$, wherein said transmission antenna is formed by a set of transducers with a length a aligned on a distance L with a pitch d such that $a = (\frac{2}{3})d$.

2. A method according to claim 1, wherein echoes are received from at least one of the sub-sectors with a reception antenna, a major reception lobe of which covers this sub-sector.

3. A method according to claim 1, wherein the tiered frequencies are determined so that the image lobes correspond to two adjacent frequencies overlapping at a level corresponding to a value of $-x$ Db.

4. A method for the formation of channels for sonar wherein a transmission antenna, comprising a set a transducers, is used, having a radiation pattern essentially formed by two ±first order image lobes irrespectively of a transmission frequency thereof, the orientation of these lobes depending on said transmission frequency, and wherein the transmission antenna is supplied at each recurrence with pulses at tiered frequencies in such a way that the image lobes corresponding to these tiered frequencies fill two sub-sectors that are symmetrical with an axis of the antenna and each occupy an angle $\theta$, wherein the set of transducers of said transmission antenna of the sonar is made to rotate mechanically about an axis making it possible to cover a sector with an aperture formed by a set of sub-sectors, with an aperture $\theta$, that are substantially contiguous on an entire main sector.

5. A method according to claim 2, wherein echos are received from only one of the two sub-sectors with only one reception antenna, the set of transducers of said transmission antenna of the sonar being fixed.

6. A method according to claim 5, wherein a weighting is performed on the reception antenna to eliminate the reception of echos from the other transmission sub section.

7. A method for the formation of channels for sonar wherein a transmission antenna is used, having a radiation pattern essentially formed by two ±first order image lobes irrespectively of a transmission frequency thereof, the orientation of these lobes depending on said transmission frequency, and wherein this antenna is supplied at each recurrence with pulses at tiered frequencies in such a way the image lobes corresponding to these tiered frequencies fill two sub-sectors that are symmetrical with the axis of the antenna and each occupy an angle $\theta$, wherein each transmission frequency is encoded and wherein frequencies received are separated by a correlation method.

8. A method according to claim 7, wherein the code transmitted is a frequency modulation around the center frequency $f_1$ corresponding to each lobe.

* * * * *